United States Patent [19]
Firmin et al.

[11] Patent Number: 5,187,030
[45] Date of Patent: Feb. 16, 1993

[54] ELECTROCHEMICAL BATTERY HAVING HIGH ENERGY PER UNIT MASS

[75] Inventors: Jean-Luc Firmin; Alain Alexandre, both of Poitiers, France

[73] Assignee: SAFT, Romainville, France

[21] Appl. No.: 730,724

[22] Filed: Jul. 16, 1991

[30] Foreign Application Priority Data

Jul. 15, 1991 [FR] France .................. 91 08888

[51] Int. Cl.[5] .......................................... H01M 10/50
[52] U.S. Cl. ...................................... 429/120; 429/194
[58] Field of Search ..................... 429/26, 120, 194; 165/157, 158, 163, 177

[56] References Cited

U.S. PATENT DOCUMENTS

| | | | |
|---|---|---|---|
| 3,865,630 | 2/1975 | Reimers | 429/26 |
| 4,189,527 | 2/1980 | Stadnick | 429/26 |
| 4,706,737 | 11/1987 | Taylor et al. | 165/47 |
| 4,945,010 | 7/1990 | Kaufman et al. | 429/26 |

Primary Examiner—Anthony Skapars
Attorney, Agent, or Firm—Sughrue, Mion, Zinn, Macpeak & Seas

[57] ABSTRACT

An electrochemical battery having high energy per unit mass, and in particularly a lithium and thionyl chloride battery, comprising a stack (10) of positive and negative electrodes within a housing (2) closed by a cover (3), two metal terminals connected respectively to said positive electrodes and said negative electrodes passing through the stack and emerging from said cover, the battery being characterized by the fact that one of said terminals (24) is in the form of a hermetically closed tube (30) lined internally with a capillary structure, filled with a heat-conveying fluid, and passing through the bottom (7) of said housing to be in contact with a cooling means (33), said terminal thus constituting a heat pipe for said battery.

6 Claims, 4 Drawing Sheets

ELECTROCHEMICAL BATTERY HAVING HIGH ENERGY PER UNIT MASS

The present invention relates to an electrochemical battery having high energy per unit mass such as a lithium primary battery for example, capable of providing an energy density of 200 Wh/kg to 400 Wh/kg.

While such a battery is discharging, particularly at high current densities, a fraction of the energy is transformed into heat. A portion of the heat is removed by conduction from the electrode cores to the outer structure of the battery and then by radiation or by conduction if there is sufficient thermal conduction between the battery and its support. However, the major portion of the heat is stored inside the battery and its temperature rises.

For most conventional batteries, such a temperature rise is not detrimental.

Thus, a silver-zinc battery capable of providing an energy density of 100 Wh/kg may be subject to a maximum temperature rise of 90° C. during adiabatic discharge. Since the maximum acceptable temperature at the end of discharge for such a battery is about 120° C., the battery may be discharged adiabatically without any major safety problem, and it is therefore not necessary to provide a special device for removing heat.

A silver chloride and magnesium, sea water battery providing an energy density of the same order as that of a silver-zinc battery requires a flow of sea water to provide satisfactory operation.

With a lithium battery capable of providing an energy density that may reach 200 Wh/kg to 400 Wh/kg, an adiabatic discharge would lead to a prohibitive temperature rise (e.g. 180° C. for a battery providing 250 Wh/kg). This would cause the lithium to melt and the battery to explode before the end of discharge. Since it is essential for such a battery to remain hermetically closed both during and after operation, the problem of removing heat can only be solved by associating the battery with heat exchanger means.

One solution has already been proposed in European patent No. EP-A-0 230 901. The battery electrolyte circulates through the electrochemical couples and then through an external heat exchanger. This solution is well adapted to certain types of large-size batteries, however it is not easily applied to a compact battery or to a battery made up of separate cells as used in particular for powering space vehicles.

In the latter type of battery, provision has already been made for establishing satisfactory thermal contact via a thin membrane between each cell of the battery and which is associated with a thermally conductive sheet made of aluminum and connected to a cold plate acting as a heat exchanger. Such a disposition is well suited for medium rate discharges lasting a few hours. However, in applications requiring more rapid discharging it is unsufficient because of the thermal gradients that appear firstly within each cell and secondly in the thermal conductors connecting the cells to the cold plate.

An object of the present invention is to provide a structure for an electrochemical battery having high energy per unit mass and enabling the heat generated during rapid discharges to be removed.

The present invention provides an electrochemical battery having high energy per unit mass, and in particular a lithium and thionyl chloride primary battery, comprising a stack of positive and negative electrodes within a housing closed by a cover, two metal terminals connected respectively to said positive electrodes and the said negative electrodes passing through the stack and emerging from said cover, the battery being characterized by the fact that one of said terminals is in the form of a hermetically closed tube lined internally with a capillary structure, filled with a heat-conveying fluid, and passing through the bottom of said housing to be in contact with a cooling means, said terminal thus constituting a heat pipe for said battery.

Said capillary structure may be a structure formed by a cloth fixed to the inside face of said tube.

In other variant embodiments that are preferably used when the battery is likely to operate in weightlessness, the inside face of said tube is machined in the form of capillary grooves parallel to the axis of said tube. This cross-section may be substantially circular or substantially rectangular.

The capillary structure of said tube constitutes a liquid pump. The heat-conveying fluid evaporates in the heated zone of the battery. the vapor flows along the tube towards its cold end at the end of the battery where it condenses and releases its latent heat. The condensate returns towards the center of the battery through the capillary structure by means of a phenomenon called "capillary pumping". Liquid flow and vapor flow are caused by pressure variation in the vapor and liquid phases, this variation is generally very small and consequently the temperature is substantially constant along the heat pipe: an isothermal situation is achieved.

In addition, the metal current collectors of the electrodes connected to the heat pipe terminal act as fins for collecting heat over the entire reactive area of the electrodes and for conveying it to a heat pipe. The heat pipe terminal is preferably centrally located in the battery. It may be the positive terminal or the negative terminal. In a lithium and thionyl chloride battery, it is advantageously the nickel negative terminal connected to the nickel foil of the lithium electrodes.

The integrated heat pipe structure of the present invention is particularly well adapted to batteries for space applications, since it is more efficient and lighter in weight than prior art devices, and its operation is pracically unaltered in the presence of high acceleration or of weightlessness.

Other characteristics and advantages of the present invention appear from the following description of embodiments given by way of non-limiting illustration. In the accompanying drawings.

Figure 1:
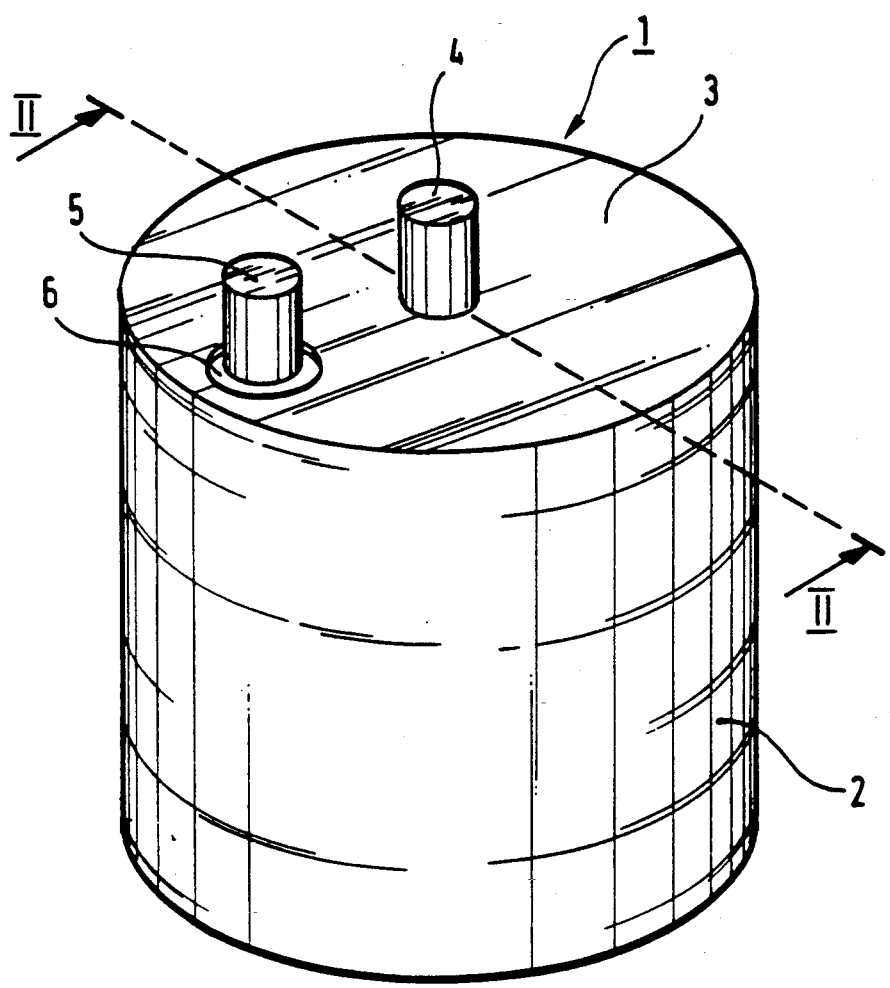
FIG. 1 is a highly diagrammatic outside view of a battery of the invention.

FIG. 1 shows a lithium and thionyl chloride battery 1 of the invention with its metal housing 2 closed by a metal cover 3, and with its negative terminal 4, and its positive terminal 5 emerging from the cover 3. A glass seal 6 is provided between the terminal 1 and the cover 3. Its dimensions are 100 mm for its diameter and 100 mm for its height. (These dimensions may be varied substantially pro rata depending on the application.)

Figure 2:
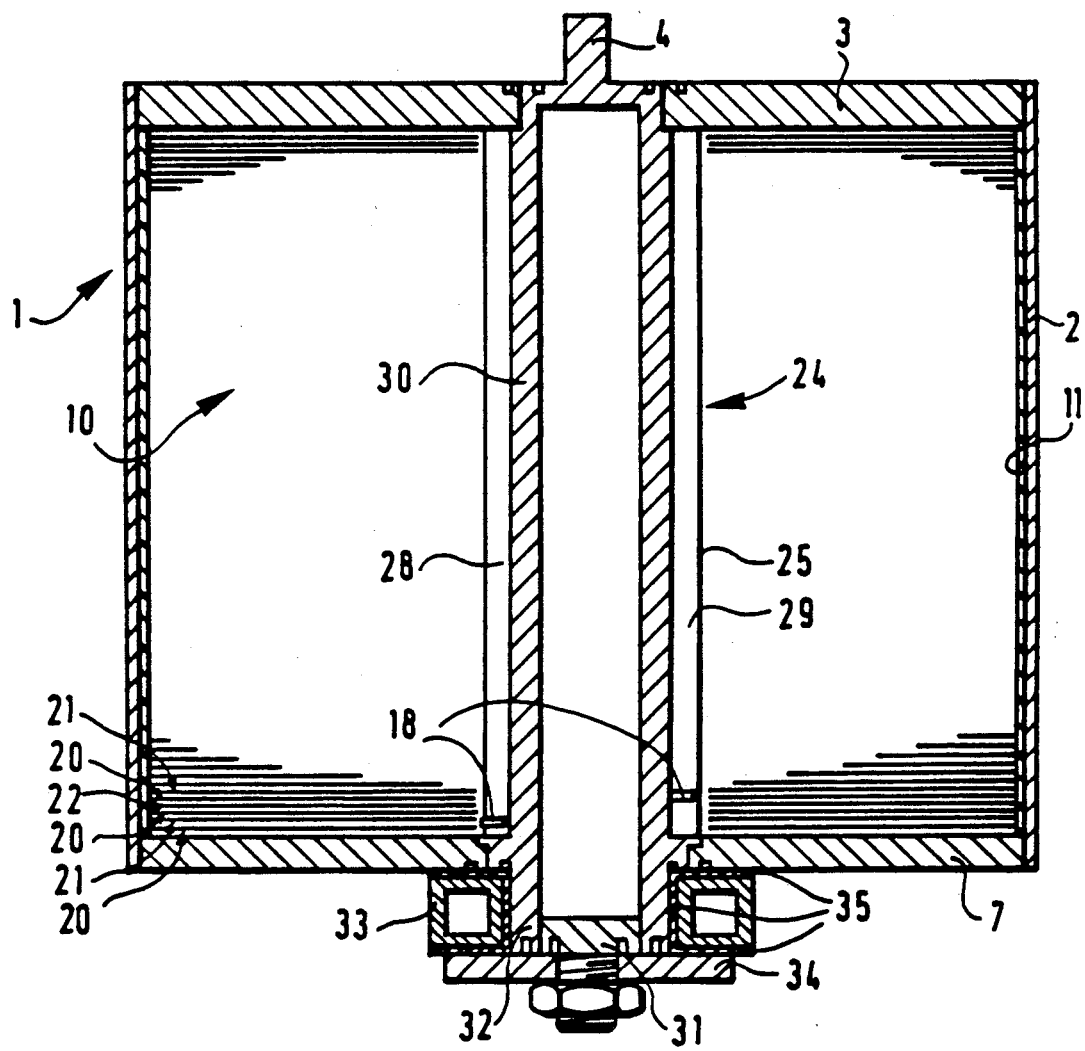
FIG. 2 is a section view on line II—II of FIG. 1.

The structure of the battery 1 can be seen more clearly in the section of FIG. 2 where a set of electrochemical couples constituting a stack 10 as in French patent FR-A 86 17426 stands on the bottom 7 of the housing 2. An insulating sheet 11 separates the stack 10 from the side wall 2.

Two electrochemical couples of the stack are shown very diagrammatically, each comprising:
an anode 21;
a separator 20; and
a cathode 22.

More precisely, the anode 21 is constituted by a nickel foil laminated between two sheets of lithium; its total thickness is 0.46 mm and its diameter is 108 mm.

The cathode 22 is made of a nickel foil laminated between two layers of carbon; its total thickness is 0.96 mm and its diameter is 107 mm.

The electrolyte comprises thionyl chloride and lithium-aluminum tetrachloride, together with known additives for guaranteeing battery performance after storage.

Each electrochemical couple is pierced by two openings, thereby forming two chimneys 25 through the stack 10, which chimneys house the positive and negative terminals of the battery. FIG. 2 shows the chimney 25 in which the negative terminal 24 is integrated, which terminal is connected to the anodes 21 and has its top portion 4 emerging from the cover 3. The positive terminal (not shown) is like that of a prior art battery, as described in French patent FR-A 86 17426.

Figure 3:
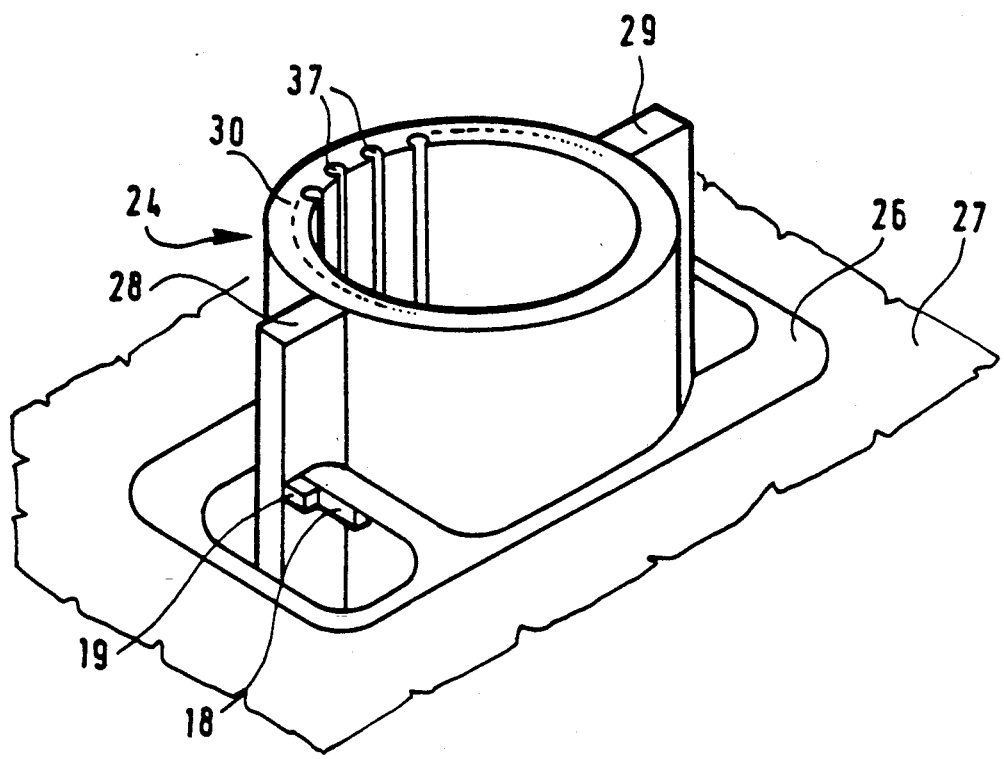
FIG. 3 is an enlarged perspective view of a connection between a heat pipe terminal of a battery of the invention and an electrode having the same polarity.

FIG. 3 shows more detail of the connection between the nickel negative terminal 24 in accordance with the invention (whose internal structure is described below) and an anode 21 having its lithium sheet 27 and its nickel foil 26 pressed against a metal spacer 18 defining the gap between the two couples. The terminal 24 is provided with two metal fins 28 and 29, one of which is welded to the spacer 18 at 19.

In accordance with the invention, the negative terminal 24 which is disposed in the central portion is made of nickel and constitutes a heat pipe, i.e. a thermal enclosure containing a heat-conveying fluid. It is made of a nickel tube 30 passing in sealed manner through the bottom 7 and closed at its bottom end 32 by a plug 31. The end 32 is in contact with a cooler 33 held against the bottom 7 by a washer 34. Sheets of thermal insulation are referenced 35.

Figure 4:
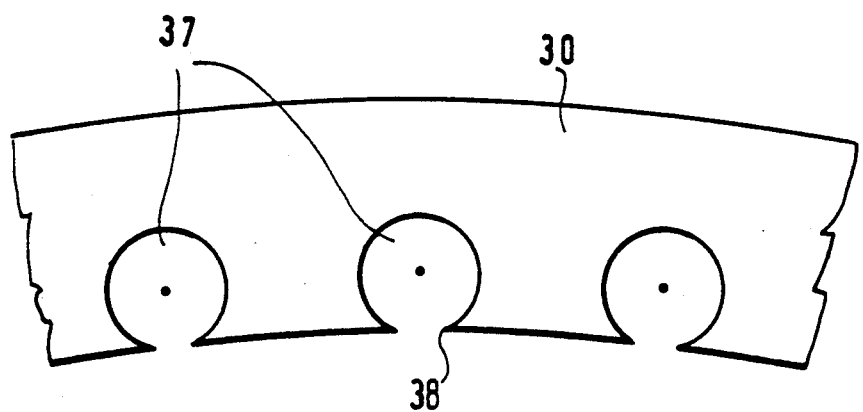
FIG. 4 shows a detail of the FIG. 3 heat pipe terminal.

As can be seen in FIG. 4, the inside wall of the tube 30 is machined to have a grooved capillary structure (not shown in the drawing of FIG. 3 for reasons of clarity). If the inside diameter of the tube 30 is 17.08 mm and its thickness is 2 mm, then 45 cylindrical grooves 37 of diameter 1 mm are provided, having their centers at 17.78 mm from the axis of the tube, and communicating with the inside of the tube via slots 38 of width 0.5 mm.

In variant embodiments, the number of cylindrical capillary grooves 37 lies in the range forty to sixty. Their diameters lie in the range 0.5 mm to 1.5 mm, and the width of the slots 38 lies in the range 0.4 mm to 0.6 mm.

In other variant embodiments, the capillary grooves are rectangular in cross-section:
the number of tubes lies in the range 50 to 100;
the depth of the tubes lies in the range 0.6 mm to 1 mm; and
the width of the tubes lies in the range 0.4 mm to 1 mm.

A heat-conveying fluid, preferably having the formula CFC13 (Freon 11) is inserted into the tube 30 under a vacuum. This fluid is completely compatible with nickel, lithium, and thionyl chloride.

The cooling means 33 is constituted by a cold plate of the kind implemented in satellites and space launchers. It may also be constituted by a tube of aluminum through which a fluid circulates at a determined temperature.

The battery shown is suitable for providing an energy density of about 400 Wh/kg.

The looked-for object is that such a battery should have a maximum operating temperature of 100° C., with its internal temperature being as uniform as possible, e.g. with the maximum difference between two points within the battery lying in the range 5° C. to 10° C.

Figure 5:
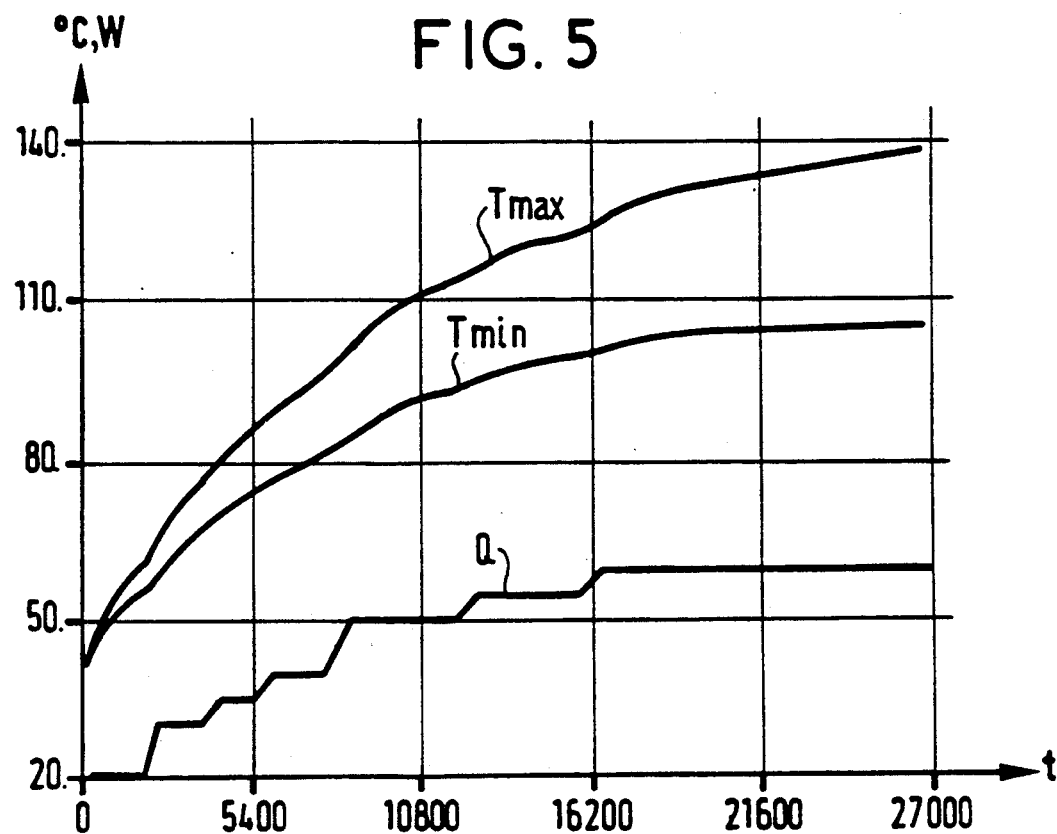
FIG. 5 is a graph showing the performance of a prior art battery.

In order to show up more clearly the advance provided by the present invention, FIG. 5 shows certain operating characteristics of a prior art battery having the same electrochemical couples as the battery of the invention, but cooled by means of the above-mentioned thin membrane and thermally conductive sheath having a thickness of 1.3 mm associated with a cold plate. The figure shows how the following vary as a function of time t (in seconds):
the minimum temperature Tmin in the battery (°C.);
the maximum temperature Tmax in the battery (°C.); and
the heat power evolved by the electrochemical reaction Q (watts).

Figure 6:
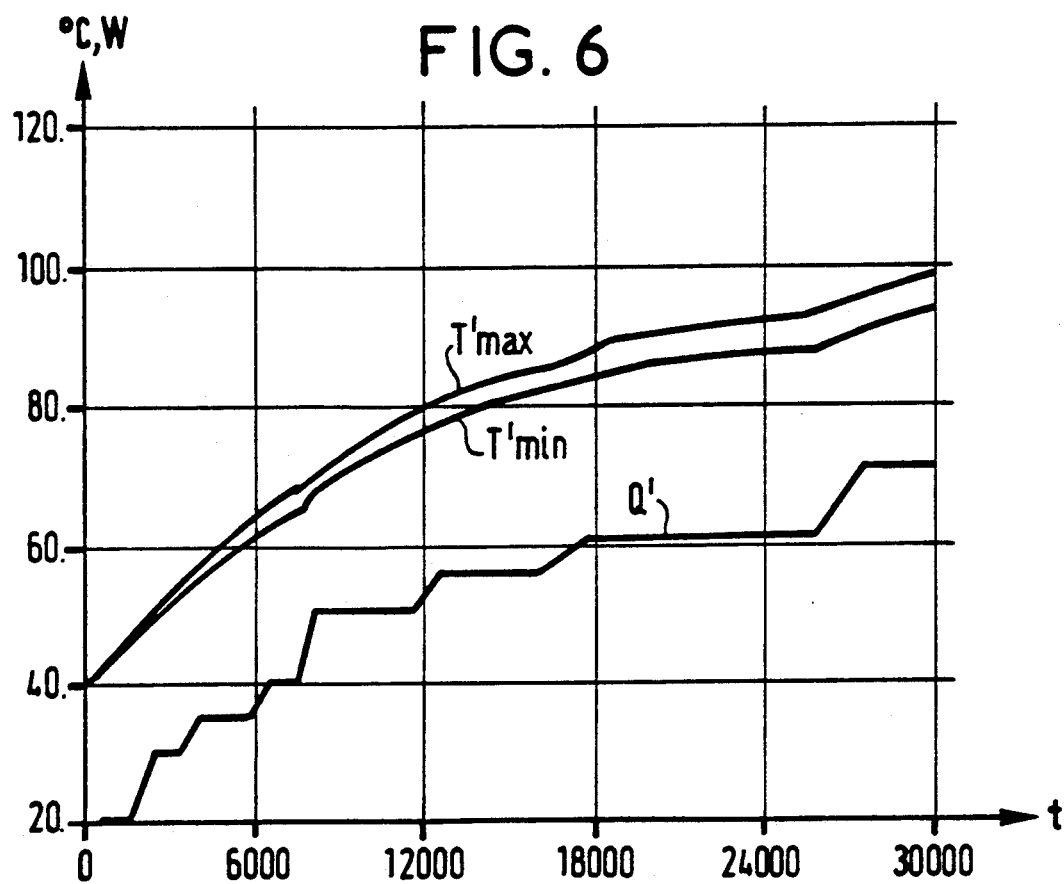
FIG. 6 is a graph analogous to FIG. 5 but for a battery of the invention.

In FIG. 6, curves T'min, T'max, and Q' show the corresponding performance of a battery of the invention.

It can be seen that for a heat power of 60 watts evolved by the electrochemical reaction, the maximum temperature of the prior art battery is 140° C., whereas that of the battery of the invention is 90° C.

It may be said that the prior art means enable a maximum heat power of 40 watts to be controlled with a minimum gradient of 15° C., whereas the structure of the invention enables a maximum heat power of 70 watts to be controlled with a temperature gradient of less than 10° C.

Naturally the invention is not limited to the embodiment described above. Without going beyond the scope of the invention any means may be replaced by equivalent means.

We claim:

1. In a electrochemical lithium and thionyl chloride battery having high energy per unit mass, comprising a stack of positive and negative electrodes within a housing closed by a cover, two metal terminals connected respectively to said positive electrodes and said negative electrodes passing through the stack and emerging from said cover, the improvement wherein one of said terminals is in the form of a hermetically closed tube lined internally with a capillary structure, filled with a CFC13 heat-conveying fluid completely compatible with nickel, lithium and thionyl chloride under a vacuum, and said hermetically closed tube passing through the bottom of said housing in contact with a cooling means and constituting a heat pipe for said battery.

2. An electrochemical battery according to claim 1, wherein said capillary structure is a structure formed by a cloth fixed to the inside face of said tube.

3. An electrochemical battery according to claim 1, wherein the inside face of said tube is machined in the form of capillary grooves parallel to the axis of said tube.

4. An electrochemical battery according to claim 3, wherein the cross-section of said grooves is substantially circular.

5. An electrochemical battery according to claim 3, wherein the cross-section of said grooves is substantially rectangular.

6. An electrochemical battery according to claim 1, wherein the positive electrodes have a carbon support, the negative electrodes are formed by means of a nickel foil laminated between two sheets of lithium, the solvent of the electrolyte which also acts as the cathode is based on thionyl chloride, the tube constituting the heat pipe is made of nickel and is integral with the nickel foil of the negative electrodes.

* * * * *